United States Patent [19]

Kuwabara et al.

[11] Patent Number: 4,880,516

[45] Date of Patent: Nov. 14, 1989

[54] ELECTRO-CHEMICAL MACHINE

[75] Inventors: Youhei Kuwabara; Teruo Asaoka; Yasuhiro Iwasaki, all of Shizuoka, Japan

[73] Assignee: Shizuoka Seiki Co., Ltd., Shizuoka, Japan

[21] Appl. No.: 206,482

[22] Filed: Jun. 13, 1988

[30] Foreign Application Priority Data

Jun. 23, 1987 [JP] Japan .................. 62-156188
Jul. 7, 1987 [JP] Japan .................. 62-168947
Oct. 28, 1987 [JP] Japan .................. 62-272843

[51] Int. Cl.$^4$ .................. B23H 3/10; B23H 7/26; B23H 9/12; B23H 7/36
[52] U.S. Cl. .................. 204/224 M; 204/225; 204/238; 204/240; 204/DIG. 9
[58] Field of Search .............. 204/224 M, 238, 129.43, 204/240, DIG. 9, 225

[56] References Cited

U.S. PATENT DOCUMENTS

| 3,239,438 | 3/1966 | Voorhees | 204/238 X |
| 3,255,097 | 6/1966 | Williams | 204/238 X |
| 3,371,022 | 2/1968 | Inoue | 204/238 X |
| 3,607,689 | 9/1971 | Inoue | 204/129.43 |
| 4,040,920 | 8/1977 | Takada et al. | 204/238 X |
| 4,040,933 | 8/1977 | Andrews | 204/238 X |

FOREIGN PATENT DOCUMENTS 266180 5/1988 European Pat. Off. .
60-26646 1/1984 Japan .
60-44228 9/1984 Japan .
61-71921 6/1985 Japan .
62-255013 12/1985 Japan .
60-177819 2/1986 Japan .
62-27616 3/1987 Japan .
60-59097 11/1987 Japan .

Primary Examiner—Donald R. Valentine
Attorney, Agent, or Firm—Flynn, Thiel, Boutell & Tanis

[57] ABSTRACT

An electro-chemical machine supplies pulses to a spaced workpiece and electrode in a working tank through an electrolyte in order to finish the workpiece, while eliminating electrolytic products produced in a gap between the workpiece and electrode by supplying clean electrolyte to the gap. This machine includes: an electrolyte filtering apparatus for removing dirty electrolyte containing electrolytic products from the working tank and filtering it; an electrolyte supplying apparatus for intermittently supplying the filtered electrolyte to the gap through a supply hole formed in the electrode; and a power supply apparatus for supplying the pulses to the workpiece and electrode when the flow of electrolyte to the gap stops. Clean electrolyte can be supplied to the gap almost simultaneously with the removal of dirty electrolyte, and then the finishing work is started. A glossy mirror surface on the workpiece can be automatically obtained by repeating those operations. The removal of dirty electrolyte and the supply of clean electrolyte can also be alternately performed using a common hole formed in the electrode.

9 Claims, 10 Drawing Sheets

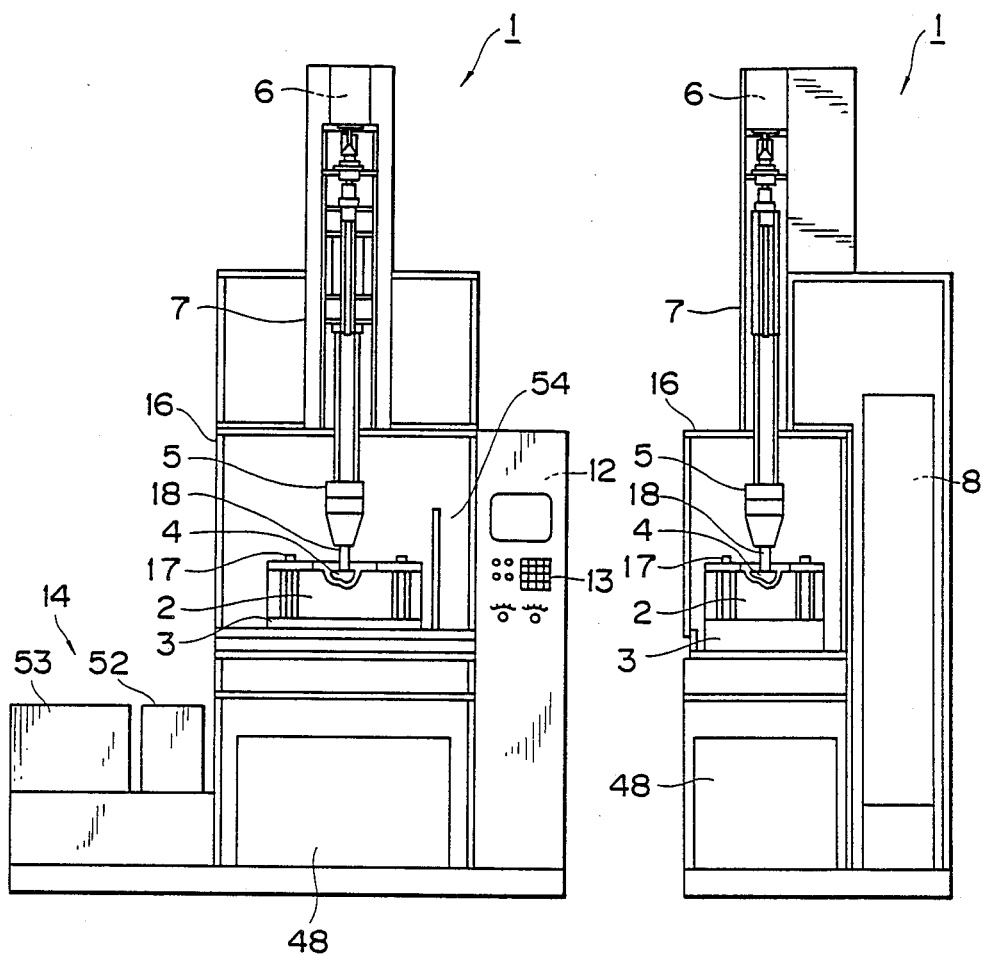

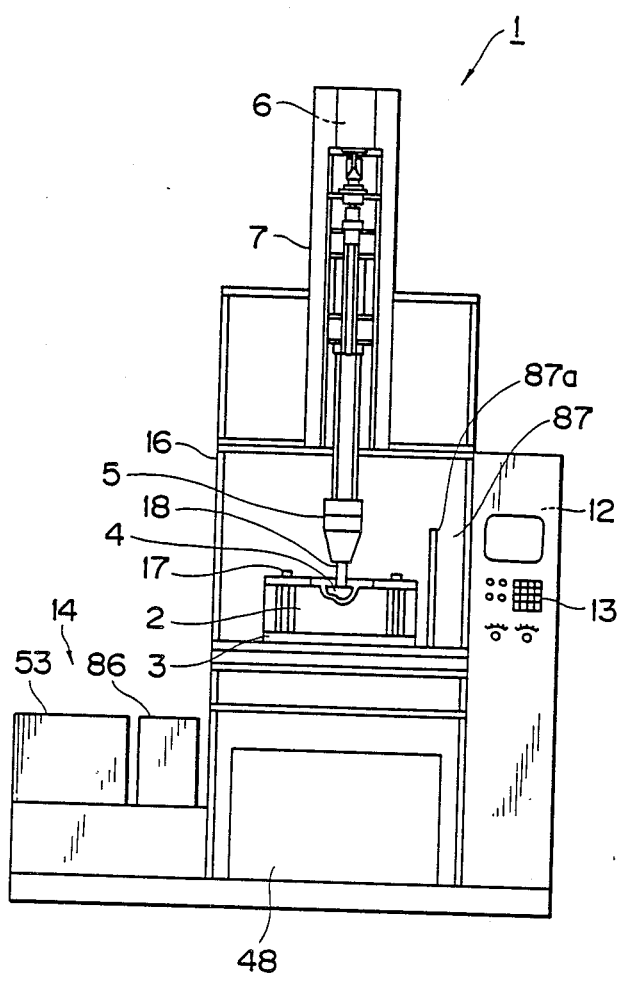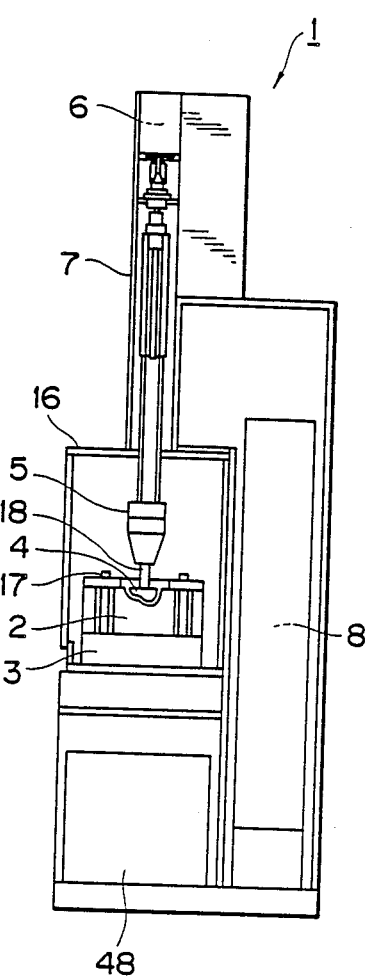
FIG. 9
FIG. 10

ELECTRO-CHEMICAL MACHINE

FIELD OF THE INVENTION

The present invention relates to an electro-chemical machine and, more particularly, to an electro-chemical machine which can produce a glossy mirror surface on a workpiece in a short period of time by highly accurately finishing a rough surface thereon having a three-dimensional shape, including a working tank of the machine in which such finishing is performed.

BACKGROUND OF THE INVENTION

As a conventional metal working machine, there is known an electro-chemical machine in which a gap between a workpiece and an electrode is filled with an electrolyte such as sodium nitrate or sodium chloride, the electrolyte is caused to flow at a high speed so that electrolytic products which would obstruct stable electrolytic action (namely, the soluted metal compound, metal ions, hydrogen gas and the like) are eliminated, and the workpiece is worked or machined by producing a direct current flow from the workpiece to the electrode (refer to Japanese Reference No. 61-71921 or 60-44228, or the like). There is also known an electric discharge machine in which a workpiece and an electrode are arranged in a working fluid such as a kerosene or the like so as to face each other across a small gap, a proper power source is connected to the workpiece and electrode, a spark discharge or transient arc discharge is instantaneously generated between the workpiece and the electrode, and the workpiece is worked by the discharge energy (refer to Japanese Reference Nos. 60-26646 or 60-177819).

However, the former electro-chemical machine has problems in that, particularly when a workpiece is three-dimensionally worked so as to leave a bottom (namely when a workpiece having a three-dimensional surface which includes a concave portion is worked), it is difficult to accurately transfer the shape of the electrode to the workpiece and a highly accurate surface quality cannot be obtained. On the other hand, the latter electric discharge machine has problems in that it is difficult to obtain a good surface roughness and, for instance, it is necessary to manually polish and finish the resulting surface to obtain a mirror surface and the like, and it takes a long time and much labor to finish the surface.

Therefore, the assignee of the present invention has already developed an electro-chemical machine which can solve those problems (see Japanese Patent Application No. 62-27616). According to this electro-chemical machine, in order to eliminate electrolytic products produced in the gap between a workpiece and electrode, electrolyte is pumped by a pump from a clean tank of an electrolyte filtering apparatus provided below a working tank, and this electrolyte is emitted from a jet nozzle arranged to be directed toward the gap, thereby eliminating electrolytic products from the gap.

However, despite emission of electrolyte by such a jet nozzle, when the working surface has a complicated shape it is difficult to uniformly emit the electrolyte to the working surface. The surface portions where electrolytic products were efficiently eliminated have better characteristics than the surface portions where they were not efficiently eliminated. Thus, a difference in working conditions occurs on the working surface and a fringe pattern appears. This is a drawback in that the overall surface quality deteriorates significantly in comparison to simpler surface shapes.

SUMMARY OF THE INVENTION

It is thus a first object of the present invention to provide an improved electro-chemical machine, in which an electrolyte is intermittently emitted from a supply hole formed in an electrode and, after the flow of electrolyte has stopped, pulses are provided so that a working surface of three-dimensional shape on a workpiece is highly accurately finished in a short period of time to a glossy mirror surface.

According to one aspect of the present invention, the first object is accomplished by an electro-chemical machine in which pulses are supplied to a workpiece and an electrode arranged to face each other through an electrolyte in a working tank, and in which the workpiece is worked and finished while eliminating electrolytic products produced in the gap between the workpiece and electrode, this machine including: an electrolyte filtering apparatus for withdrawing and filtering the electrolyte containing electrolytic products from the working tank; an electrolyte supplying apparatus for intermittently supplying the electrolyte filtered by the electrolyte filtering apparatus into the gap through a supply hole formed in the electrode; and a power supply apparatus for supplying pulses to the workpiece and electrode when the flow of electrolyte into the gap from the electrolyte supplying apparatus stops.

With this constitution of the electro-chemical machine, the electrolyte filtered by the electrolyte filtering appartus is intermittently emitted through the supply hole formed in the electrode to the gap between the workpiece and the electrode by the electrolyte supplying apparatus. Therefore, electrolytic products produced in the gap can be reliably eliminated. Further, pulses are supplied from the power supply apparatus when the electrolyte flow stops, so that the working conditions for the whole working surface can be uniform without being influenced by the flow of the electrolyte.

It is a second object of the invention to provide an improved electro-chemical machine, in which an electrolyte existing in a gap between a workpiece and an electrode is withdrawn through a hole formed in the electrode and, after a flow of clean electrolyte to this gas has stopped, pulse current is supplied to the workpiece and electrode so that a working surface of three-dimensional shape on the workpiece is highly accurately finished in a short period of time to a glossy mirror surface.

According to another aspect of the invention, the second object is accomplished by an electro-chemical machine in which a pulse current is supplied to a workpiece and an electrode arranged to face each other through an electrode in a working tank, and in which the workpiece is worked and finished while eliminating electrolytic products produced in a gap between the workpiece and the electrode, this electro-chemical machine including: an electrolyte filtering apparatus for withdrawing and filtering electrolyte containing electrolytic products through a hole formed in the electrode and communicating at one end with the gap; an electrolyte supplying apparatus for intermittently supplying electrolyte filtered by the electrolyte filtering apparatus to the gap; and a power supply apparatus for supplying pulse current to the workpiece and electrode when the flow of electrolyte to the gap from the electrolyte supplying apparatus stops.

With this constitution of this electro-chemical machine, the electrolyte containing electrolytic products produced in the gap between the workpiece and the electrode is withdrawn through the hole formed in the electrode and is filtered by the electrolyte filtering apparatus, and the filtered electrolyte is intermittently emitted into the gap between the workpiece and electrode by the electrolyte supplying apparatus. A pulse current is supplied from the power supply apparatus when the flow of electrolyte stops. Therefore, electrolytic products produced in the gap are reliably eliminated. The working conditions for the whole working surface can be made uniform without being influenced by the flow of electrolyte or the like.

It is the third object of the invention to provide an improved working tank for an electro-chemical machine, in which electrolyte is supplied to a gap between a workpiece and an electrode from an electrolyte storage tank provided in a working tank, thereby preventing a variation in conditions of the electrolyte within the working tank, and the supply of the electrolyte is accurately controlled so that a working surface of three-dimensional shape on the workpiece is highly accurately finished in a short period of time to a glossy mirror surface.

According to still another aspect of the invention, the third object is accomplished by providing an electro-chemical machine in which a working tank is provided to hold an electrolyte, in which a workpiece and electrode are arranged in the electrolyte with a predetermined gap therebetween, in which pulses are supplied to the workpiece and electrode, and in which the working surface is worked and finished while eliminating electrolytic products produced in the gap, the working tank having therein an electrolyte storage tank to temporarily store electrolyte which is to be intermittently supplied to the gap in order to eliminate electrolytic products.

With this constitution of the electro-chemical machine, the electrolyte filtered by the electrolyte filtering apparatus is initially stored in the electrolyte storage tank provided in the working tanf in which the workpiece and electrode are arranged. Conditions such as temperature and the like of the electrolyte in the electrolyte storage tank are substantially equalized to those of the electrolyte in the working tank. The electrolyte in the storage tank is supplied to the gap between the workpiece and the electrode by the electrolyte supplying apparatus without needing a pump of a large capacity or the like, to thereby eliminate electrolyte products produced in the gap.

The above and other objects and features of the present invention will become apparent from the following detailed description and the appended claims, with reference to the accompanying drawings.

BRIEF DESCRIPTION OF THE DRAWINGS

Several embodiments of the present invention will be described in detail hereinbelow with reference to the drawings, in which:

FIG. 1 is an elevational front view of an electro-chemical machine according to a first embodiment of the invention;

FIG. 2 is a side elevational view of the machine of FIG. 1;

FIG. 9 is a front view of an electro-chemical machine according to a fourth embodiment of the invention;

FIG. 10 is a side elevational view of the machine of FIG. 9;

DETAILED DESCRIPTION

Figure 3:
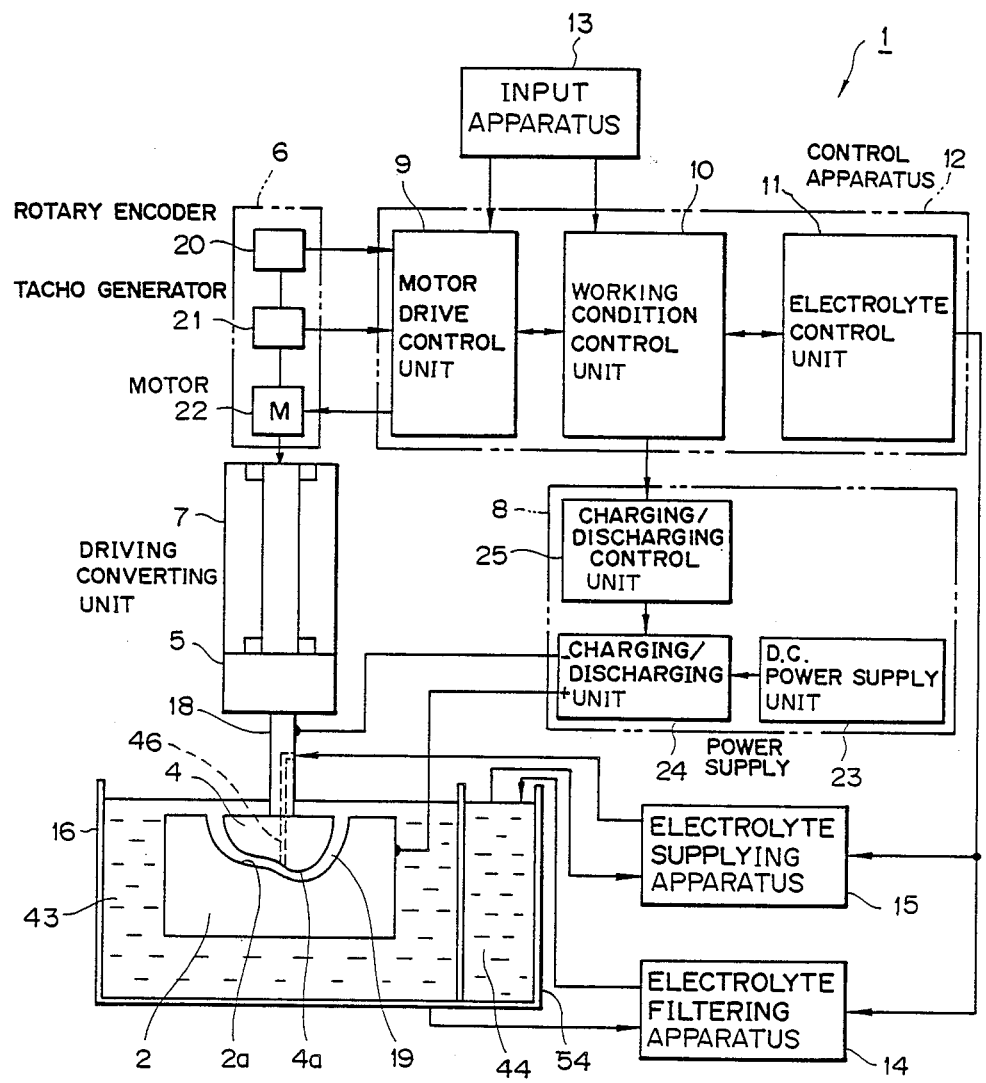
FIG. 3 is a diagrammatic view of various components of the machine of FIG. 1.

FIGS. 1 to 5 show the first embodiment of the invention. In FIGS. 1 to 3, reference numeral 1 denotes an electro-chemical machine according to the invention. This machine comprises: a workpiece fixing apparatus 3 to fixedly support a workpiece 2; an electrode fixing apparatus 5 to fixedly support an electrode 4; a drive converting unit 7 to convert the rotational motion of an electrode drive unit 6 into reciprocating motion; a power supply apparatus 8 to generate a pulse current; a control apparatus 12 consisting of a motor drive control unit 9, a working condition control unit 10, and an electrolyte control unit 11; an input apparatus 13 to input data regarding the workpiece 2 and the like; an electrolyte filtering apparatus 14; an electrolyte supplying apparatus 15; and a working tank 16.

The workpiece fixing apparatus 3 is a table made of graphite or ceramics and having a high insulation property. The workpiece 2 which is worked (or in other words machined), for example by discharge machining, is fixed to the table 3 by bolts 17 or the like. The electrode fixing apparatus 5 fixes the electrode 4, which is made for example of pure copper and is used for electric discharge machining, to the lower edge of a rod 18 attached to the lower portion of the electrode fixing apparatus 5. In this case, the electrode 4 is controlled so as to keep a uniform gap 19 in the three-dimensional direction between an electrode surface 4a and a working surface 2a of the workpiece 2. The electrode fixing apparatus 5 is vertically moved by the electrode drive unit 6 and drive converting unit 7 so as to keep the gap 19 at a predetermined value. That is, a motor 22 is driven by a control signal output from the motor drive control unit 9 in the control apparatus 12 in response to signals from a rotary encoder 20 and a tacho generator 21 in the electrode drive unit 6. The rotation of the motor 22 is converted into reciprocating motion by the drive converting unit 7, thereby vertically moving the electrode fixing apparatus 5. In this manner, the gap 19 between the electrode surface 4a and the working surface 2a is set to a predetermined value.

The power supply apparatus 8 supplies pulses to the workpiece 2 and electrode 4 so that the current density (average current per unit area) is 70 A/cm² or less. Namely, the power supply apparatus 8 generates pulses of a predetermined current density which is calculated on the basis of the surface area of the workpiece 2 in response to a control signal from the working condition control unit 10. The power supply apparatus has a DC power supply unit 23, a charging/discharging unit 24, and a charge/discharge control unit 25 as shown in FIG. 3. The power supply apparatus 8 is constituted as shown for example in FIG. 4.

Figure 4:
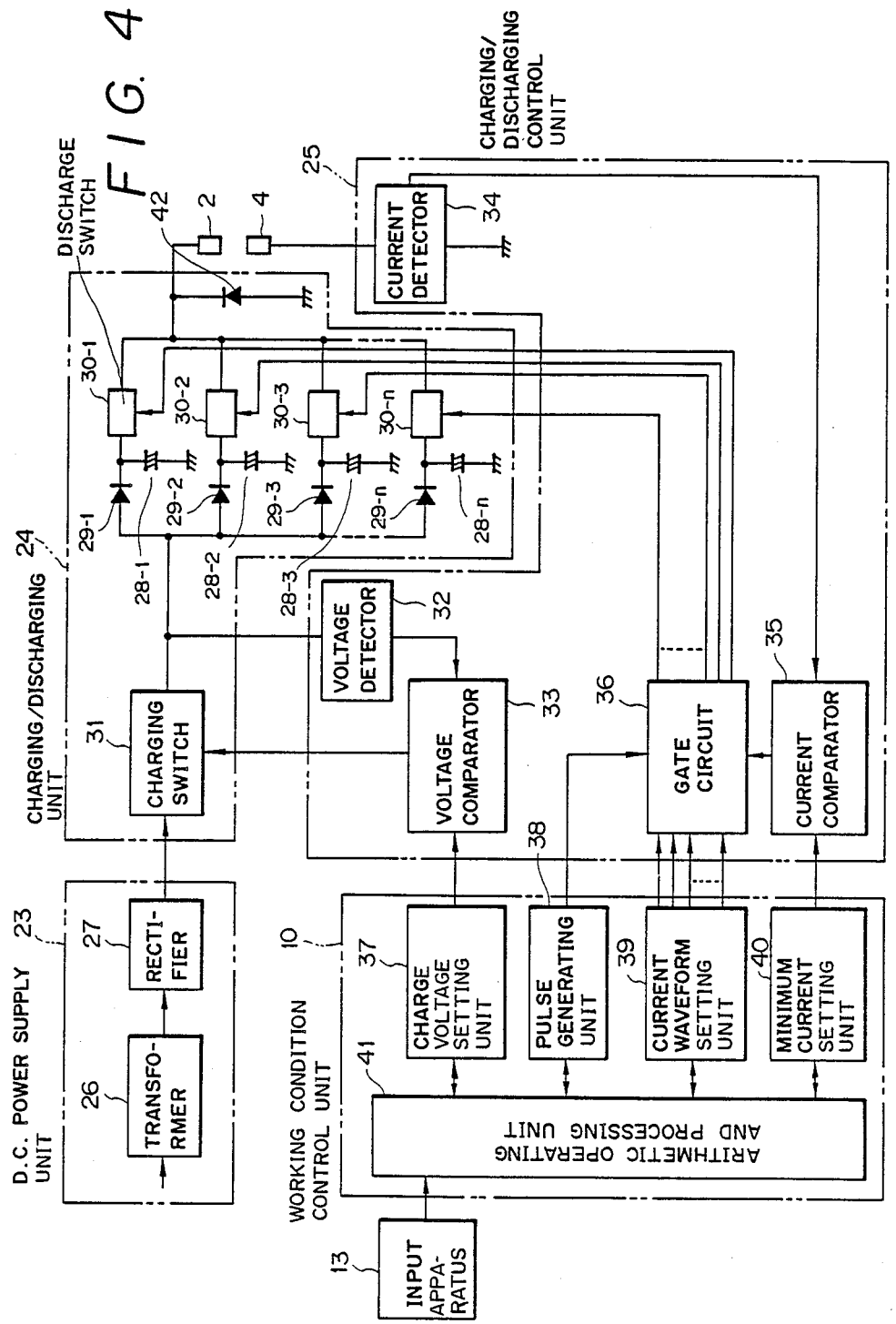
FIG. 4 is a schematic diagram showing a power supply apparatus which is part of the machine of FIG. 1.

In FIG. 4, the DC power supply unit 23 comprises a transformer 26 and a rectifier 27. A voltage is dropped to a predetermined value by the transformer 26 and rectified by the rectifier 27, thereby obtaining a direct current. This direct current is suplied to condensers 28-1 to 28-n, which will be explained hereinafter.

On the other hand, the charging/discharging unit 24 comprises: the plurality of condensers 28-1 to 28-n for discharging electric charges to the gap 19 between the workpiece 2 and electrode 4; diodes 29-1 to 29-n which are respectively connected to the condensers 28-1 to 28-n and block reverse flow of electric charges to the DC power supply unit 23; discharging switches 30-1 to 30-n which are opened or closed for allowing the charges in the condensers to be discharged; and a charging switch 31 to selectively supply and interrupt the power provided from the DC power supply unit 23 for charging the condensers 28-1 to 28-n to predetermined values.

The charge/discharge control unit 25 which controls the charging/discharging unit 24 comprises: a voltage detector 32; a voltage comparator 33; a current detector 34; a current comparator 35; and a gate circuit 36. The voltage detector 32 detects a value of a charge voltage which is supplied to the condensers 28-1 to 28-n. The voltage comparator 33 compares a set charge voltage value set by a charge voltage setting unit 37 in the working condition control unit 10 with a detection charge voltage value which is detected by the voltage detector 32. The current detector 34 detects a current value of the charges which are discharged to the gap 19 between the workpiece 2 and the electrode 4. The current comparator 35 compares the minimum current value set by a minimum current setting unit 40 in the control unit 10 with a discharge current value which is detected by the current detector 34. The gate circuit 36 receives a comparison signal from the current comparator 35, a pulse signal from a pulse generating unit 38, and a signal indicative of a current waveform which is set by a current waveform setting unit 39. The pulse generating unit 38 and current waveform setting unit 39 are provided in the working condition control unit 10. When the detection current value is not smaller than the minimum current value specified by unit 40, the charges in the condensers 28-1 to 28-n are properly discharged to the discharge side. When the detection current value is smaller than the minimum current value, the discharge of the charges from the condensers 28-1 to 28-n is stopped. On the basis of received signals, the gate circuit 36 outputs respective opening/closing signals to the discharging switches 30-1 to 3-n to thereby stop or start the discharge of charges from the respective condensers 28-1 to 28-n mentioned above.

The control unit 10 in the control apparatus 12 controls the charge/discharge control unit 25, and comprises: the charge voltage setting unit 37; the pulse generating unit 38; and current waveform setting unit 39; the minimum current setting unit 40; an arithmetic operating and processing unit (CPU) 41 for arithmetically operating and processing working conditions and the like on the basis of input data from the input apparatus 13, and the like.

In FIG. 4, a diode 42 is provided to prevent the destruction of each of the discharging switches 30-1 to 30-n by a counterelectromotive force when these switches are opened.

The input apparatus 13 provides various kinds of working data such as material and surface area of the workpiece 2, finishing stock, degree of dimensional accuracy, degree of finishing surface roughness, required gap between the workpiece and the electrode, and the like. These signals are supplied to the motor drive control unit 9 and working condition control unit 10 in the control apparatus 12.

On the basis of the control signal from the electrolyte control unit 11, the electrolyte filtering apparatus 14 filters the electrolyte, which contains electrolytic products produced in the gap by the working, and the electrolyte supplying apparatus 15 emits the clean filtered electrolyte into the gap 19 at a constant pressure from a supply hole 46 formed in the electrode 4 and rod 18. The electrolytic products and the like produced in the gap 19 during the working are eliminated by the emitted electrolyte. The electrolyte filtering apparatus 14 and electrolyte supplying apparatus 15 are constituted as shown for example in FIG. 5.

Figure 5:
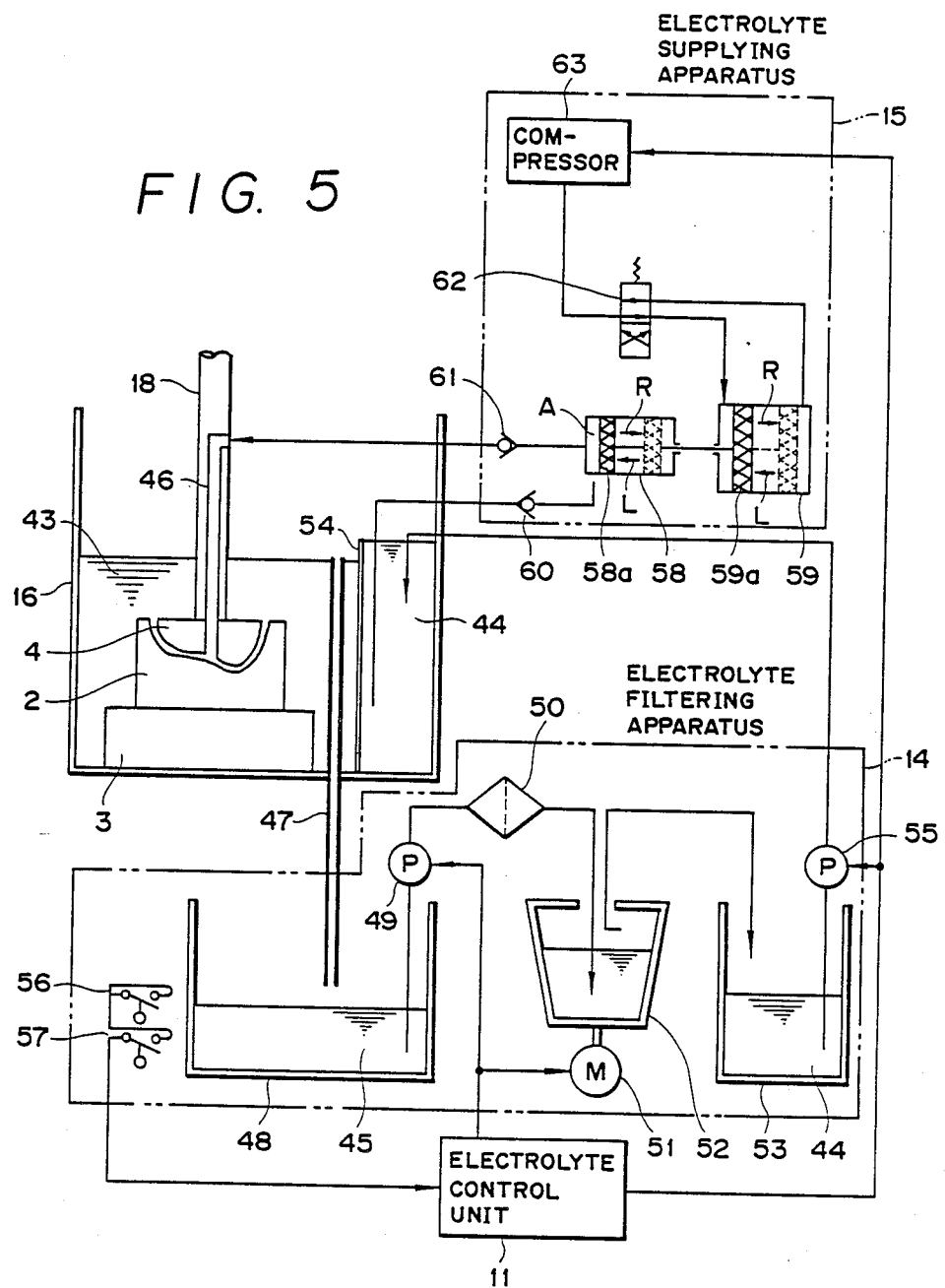
FIG. 5 is a diagrammatic view of components including an electrolyte filtering apparatus and an electrolyte supplying apparatus of the machine of FIG. 1.

In FIG. 5, the electrolyte filtering apparatus 14 comprises: a dirty tank 48; a centrifugal separator 52; a clean tank 53; an electromagnetic pump 55; an upper limit float switch 56; and a lower limit float switch 57. An electrolyte 45 containing a large amount of electrolytic products is stored into the dirty tank 48 through an exhaust pipe 47 extending to the electrolyte 43 in the working tank 16. The electrolyte 45 in the dirty tank 48 is pumped by an electromagnetic pump 49 through a filter 50. Electrolytic products remaining in the filtered electrolyte are separated therefrom by the centrifugal separator 52 by rotating the eparator at a high speed by a motor 51. Clean electrolyte 44 from the centrifugal separator 52 containing no electrolytic products is stored in the clean tank 53. The electrolyte 44 in the clean tank 53 is pumped by the electromagnetic pump 55 to a sub-tank 54 provided in a part of the working tank 16. The upper and lower limit float switches 56 and 57 detect the level of the surface of the electrolyte in the dirty tank 48.

On the other hand, the electrolyte supplying apparatus 15 comprises: a driven first cylinder 58; a second cylinder 59 which drives the first cylinder 58; and a compressor 63. The first cylinder 58 is coupled with the sub-tank 54 through a check valve 60. The first cylinder 58 is also coupled with the supply hole 46 formed in the rod 18 and electrode 4 through a check valve 61. The piston rod of the second cylinder 59 is coupled with that of the first cylinder 58. The compressor 63 is coupled with the second cylinder 59 through an electromagnetic valve 62.

Under the control of the electrolyte control unit 11, which controls the electrolyte filtering apparatus 14 and electrolyte supplying apparatus 15 on the basis of control signals from the working condition control unit 10, the electromagnetic pumps 49 and 55 and the motor 51 are actuated, so that the electrolyte 45 in tank 48 is filtered and supplied to the sub-tank 54. The compressor 63 is also driven to make the first and second cylinders 58 and 59 operative to thereby supply the electrolyte 44 from the sub-tank 54 to the gap 19 through the supply hole 46.

The operation of the electro-chemical apparatus will now be described in accordance with a finishing method.

For finishing working, the workpiece 2, which was previously worked into a desired shape, for example by electric discharge working, is fixed to the workpiece fixing apparatus 3. The electrode 4 which was used in the electric discharge working is fixed to the lower end of the rod 18 of the electrode fixing apparatus 5. The electrode 4 is moved down so that the electrode surface 4a faces and comes into contact with the working surface 2a of the workpiece 2. Then, the electrode 4 is dipped into the electrolyte 43 in the working ank 16 together with the workpiece 2. This position is set to be an origin Q and is input to the CPU 41 by the input apparatus 13. When the electrode 4 is lifted up to a position to keep the working electrode gap 19 which is set in the CPU 41, and the gap 19 between the working surface 2a and the electrode surface 4a is filled with the electrolyte 43, this position is set to be a working origin and the finishing work is started from this working origin.

In the initial stage of the finishing work to improve the surface roughness, pulses of a low current density, such that the ON period of time of the pulse is, for example, 5 msec or less, are supplied from the power supply apparatus 8 to the workpiece 2 and electrode 4 in response to a control signal from the control unit 10. Thus, the raw material of the workpiece 2a is eluted. After one or a plurality of predetermined pulses have been supplied, the electrolyte 45 containing electrolytic products in the gap 19 is eliminated by the electrolyte 44 which is emitted from the supply hole 46 by the action of the cylinders 58 and 59 of the electrolyte supplying apparatus 15.

After the electrolytic products have been eliminated, the electrode 4 descends until the electrode surface 4a comes into contact with the working surface 2a. Then, the position of the origin Q and the present position are compared by the control apparatus 12, thereby measuring a working depth produced by the single working operation (the working by one pulse or a few pulses). Thereafter, the electrode 4 is again elevated so as to restore the predetermined gap 19 between the working surface 2a and the electrode surface 4a. The electrolyte 43 (mixed with the emitted electrolyte 44) in the working tank 16 flows into the gap between the working surface 2a and the electrode surface 4a. After the electrode 4 has reached a predetermined position (the position adapted to keep the predetermined gap 19 between the electrode surface 4a and the working surface 2a), the working operation is stopped for one to five seconds until the electrolyte 43 stops (in a state in which the flow and motion of the electrolyte is substantially non-existent). After elapse of this short period of time, pulses are supplied to start the next working operation.

The operation of the electrolyte filtering apparatus 14 and electrolyte supplying apparatus 15 will now be described.

The electrolyte 45 containing electrolytic products which is drained from the working tank 16 is stored into the dirty tank 48. The electrolyte surface level is detected by the upper and lower limit float switches 56 and 57 and a detection signal is input to the electrolyte control unit 11. When the electrolyte surface level in the dirty tank 48 has reached a predetermined value, that is, when this level falls within a range between the upper and lower limit float switches 56 and 57, the control unit 11 outputs a drive signal to the electromagnetic pump 49. Thus, the electrolyte 45 in the dirty tank 48 is pumped by the pump 49 and transferred to the centrifugal separator 52 through the filter 50.

In response to a control signal from the electrolyte control unit 11, the motor 51 is driven to rotate the centrifugal separator 52, so that the electrolyte 45 is separated out by centrifugal force. The separated electrolyte 44 containing no electrolytic products is stored into the clean tank 53. The electromagnetic pump 55 is made operative by a control signal from the control unit 11 and pumps the electrolyte 44 from the clean tank 53 into the sub-tank 54.

The electrolyte 44 stored in the sub-tank 54 is held under the same conditions as the electrolyte 43 in the working tank 16. Namely, the conditions of temperature and the like are set to be substantially equal. In this state, the electrolyte 44 is supplied to the gap 19 on the basis of the control signal which is generated from the working condition control unit 10. Namely, after completion of the working a predetermined number of times, the electrolyte control unit 11 outputs a signal to the compressor 63. The compressor 63 supplies air to the cylinder 59, thereby moving a piston 59a in the direction indicated by an arrow R in FIG. 5 (to the right). Thus, a piston 58a of the cylinder 58 which is coupled with the piston 59a is likewise moved in the direction of the arrow R. Thus, electrolyte 44 from the sub-tank 54 is drawn into a chamber A in the cylinder 58 in a predetermined amount. After a predetermined quantity of electrolyte 44 has been stored in the chamber A, the electrolyte control unit 11 outputs a signal to the compressor 63 to make the electromagnetic valve 62 operative, thereby exhausting air in the cylinder 59 by reversing the connections thereto. Thus, the piston 59a is moved in the direction indicated by an arrow L (to the left in FIG. 5), and the piston 58a of the cylinder 58 is also moved in the direction of the arrow L, thereby forcing the electrolyte 44 in the chamber A to flow into the gap 19 through the supply hole 46. The check valves 60 and 61 function to prevent the electrolyte 44 from flowing in directions other than certain predetermined directions.

The foregoing finishing work is repeated a predetermined number of times on the basis of a command from the control apparatus 12. An accumulated value of the working depths is compared with a set value of the working depth which is calculated by the working condition control unit 10 on the basis of the input data generated from the input apparatus 13. When the difference between the accumulated value of the working depths and the set value is less than a predetermined value (for example 1 $\mu$m), the CPU 41 outputs a control signal to the current waveform setting unit 39. The pulses generated from the power supply apparatus 8 are then changed to pulses which are adapted to form a glossy surface and which have a current density which exceeds 3/2 (150%) of the current density during the initial stage of finishing work. The working operation is performed a predetermined number of times using the new pulses in a manner similar to the foregoing method, and the finishing work is completed.

As described above, in the electro-chemical machine 1 according to the first embodiment, the electrolyte 44 filtered by the electrolyte filtering apparatus 14 is eventually stored into the sub-tank 54 provided in a part of the working tank 16. The electrolyte 44 is pumped from the sub-tank 54 by the electrolyte supplying apparatus 15 and is intermittently supplied to the gap 19 between the working surface 2a and electrode surface 4a through the supply hole 46 formed in the rod 18 and electrode 4. Therefore, the electrolyte 44 is uniformly emitted to the whole working surface 2a. The electrolytic products produced in the gap 19 can be dependably eliminated. The conditions such as temperature and the like of the electrolyte 44 in the sub-tank 54 and the electrolyte 43 in the working tank 16 can be substantially equalized. The occurrence of a variation in conditions of the electrolyte 43 in the working tank 16 can be prevented. On the other hand, there is almost no difference in level between the sub-tank 54 and the working tank 16, and no pump is used in the electrolyte supplying apparatus. Therefore, the supply of the electrolyte which is necessary for the finishing work can be accurately controlled. The working conditions for the whole working surface 2a can be uniform. A working surface of good surface quality can be obtained. Further, the workpiece 2 and electrode 4 previously worked into desired shapes are attached to the electro-chemical machine 1, finishing conditions and the like are input using the input apparatus 13, and then the machine is actuated. A three-dimensional curved surface of metal having a glossy mirror surface is then automatically obtained in a short period of time. On the surface, internal stresses are not accumulated, the metal constitution does not change, deterioration such as mechanical cracks does not occur, the thermal processing quality before working is not lost, and so forth. In the finishing field in which the degree of saving of energy and labor in the present die working is low, many advantages are obtained to improve the quality and to realize automation.

In the first embodiment, a pair of cylinders have been provided as the electrolyte supplying apparatus. However, the invention is not limited to this structure. For example, the electrolyte supplying apparatus can also be constructed by combining a pump and an electromagnetic switch having a timer ready function. On the other hand, the invention is not limited to the field of finishing dies, but can be also applied to, for example, the finishing, after completion of a thermal process, of a hypoid gear or the like by combining the electrolyte supplying apparatus with an automatic conveying apparatus.

As described in detail above for the first embodiment, an electro-chemical machine supplies pulses through an electrolyte in a working tank to a workpiece and electrode arranged so as to face each other so that the workpiece is finished while electrolytic products produced in the gap between the workpiece and electrode are eliminated, and this machine comprises: an electrolyte filtering apparatus for collecting and filtering the electrolyte containing electrolytic products in the working tank; an electrolyte supplying apparatus for intermittently supplying the electrolyte filtered by the electrolyte filtering apparatus to the working gap through a supply hole formed in the electrode; and a power supply apparatus for supplying pulses to the workpiece and electrode when the supply of electrolyte to the gap by the electrolyte supplying apparatus stops. Therefore, the electrolytic products produced in the gap between the workpiece and electrode can be reliably eliminated. The emission of the electrolyte can be accurately controlled while always keeping uniform the working conditions of the electrolyte in the working tank. The working conditions for the overall working surface become uniform. A three-dimensional metal surface having a glossy mirror surface can be obtained in a short period of time, and is highly accurate with little surface roughness.

Figure 6:
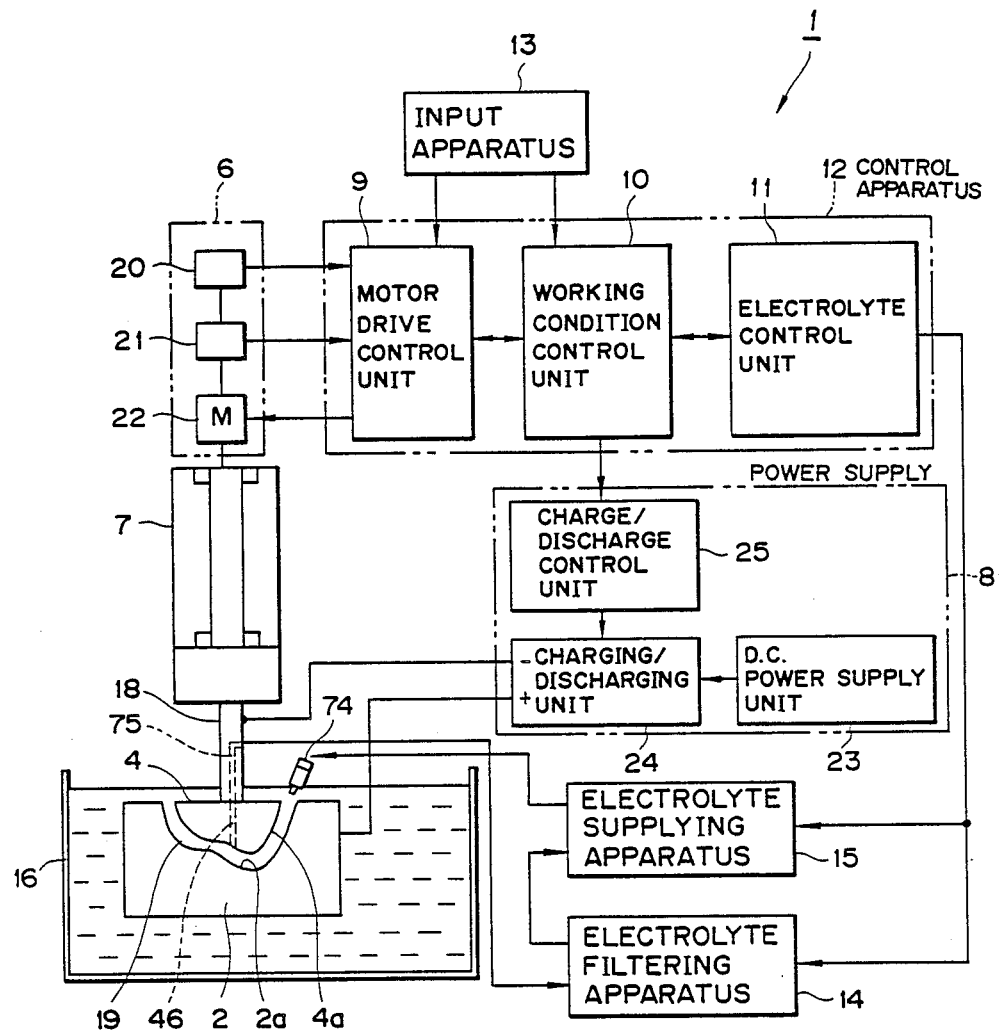
FIG. 6 is a diagrammatic view similar to FIG. 3 of an electro-chemical machine according to a second embodiment of the invention.
Figure 7:
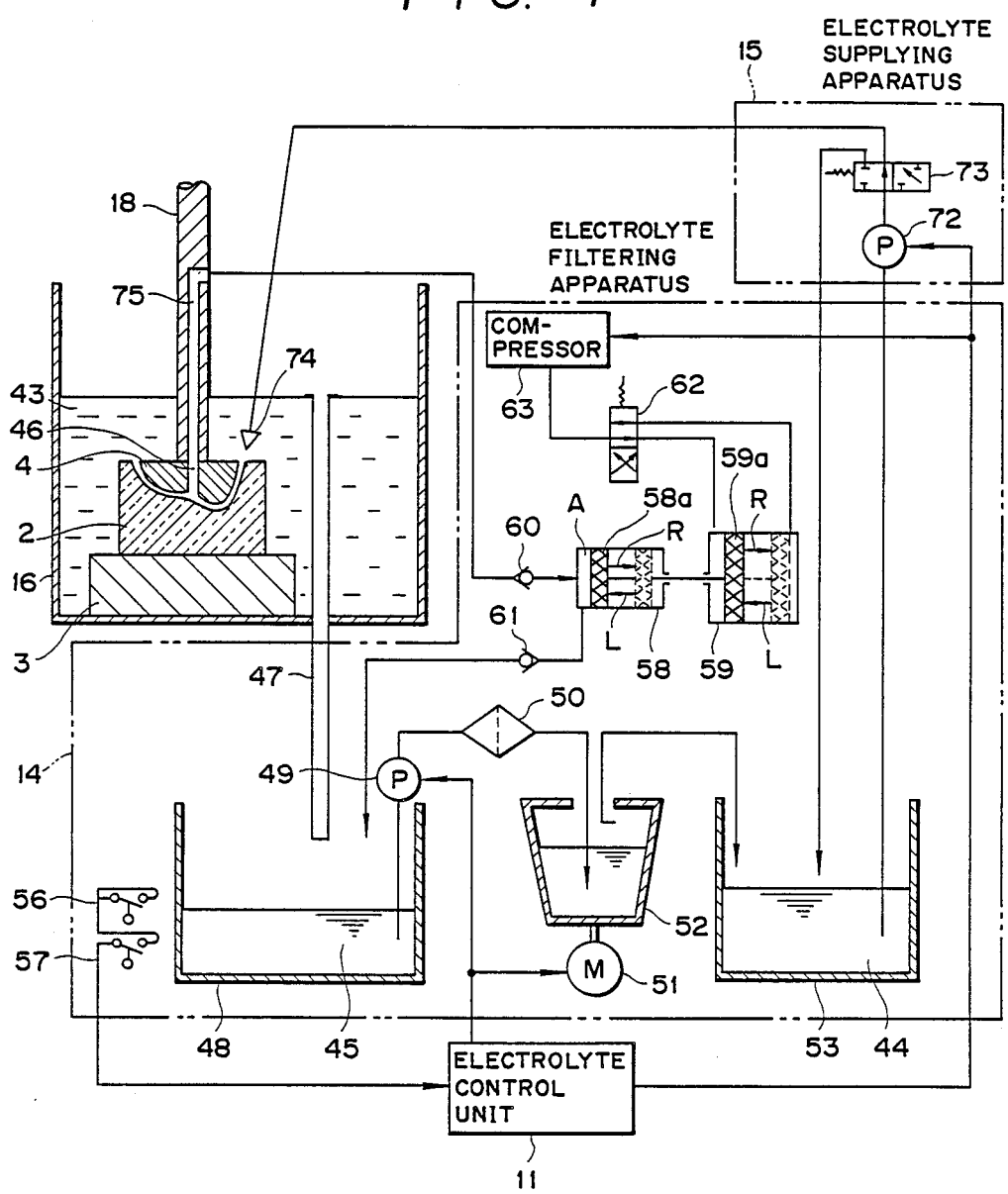
FIG. 7 is a diagrammatic view similar to FIG. 5 showing an electrolyte filtering apparatus and electrolyte supplying apparatus of the embodiment of FIG. 6.

A second embodiment of the invention will now be described with reference to FIGS. 1, 2, 4, 5, and 7. In FIGS. 6 and 7, parts and components corresponding to those in the first embodiment are designated by the same reference numerals, and descriptions thereof are omitted.

The important feature of the second embodiment, namely the difference from the first embodiment, will be described. The other portions are basically similar to the first embodiment.

In the diagrams, the electrode fixing apparatus 5 fixes the electrode 4 to the lower end of the rod 18 of the electrode fixing apparatus 5 which can keep the gap 19 uniform in the three-dimensional direction between the electrode surface 4a and the working surface 2a of the workpiece 2. The hole 46 is formed in the electrode 4. One end of the hole 46 is oipen to the gap 19 between the workpiece 2 and the electrode 4, and the other end communicates with a hole 75 formed in the rod 18. The hole 46 is formed in the electrode 4 at a position corresponding to a portion of the working surface 2a of the workpiece 2 where there is no need to form the glossy mirror surface.

On the basis of control signals from the electrolyte control unit 11, the electrolyte containing electrolytic products produced by the working is drawn into and collected through the hole 46, and is then filtered by the electrolyte filtering apparatus 14, and the filtered clean electrolyte is applied by the electrolyte supplying apparatus 15 at a constant pressure from an exhaust nozzle 74 arranged so as to be directed toward the gap 19. The electrolyte filtering apparatus 14 and electrolyte supplying apparatus are constituted as shown for example in FIG. 7.

In FIG. 7, the electrolyte filtering apparatus 14 comprises: the dirty tank 48 to store the electrolyte 45 containing a large amount of electrolytic products; the centrifugal separator 52 for accepting the electrolyte 45 pumped from the dirty tank 48 by the electromagnetic pump 49 and for separating it using centrifugal force generated by rotation of the motor 51 after it passes through the filter 50; the clean tank 53 to store the electrolyte 44 separated out by the centrifugal separator 52 and having no electrolytic products; and the upper and lower limit float switches 56 and 57 to detect the level of the electrolyte surface in the dirty tank 48.

On the other hand, the electrolyte filtering apparatus 14 comprises: the first cylinder 58 coupled with hole 75 in the rod 18 through the check valve 60 and with the dirty tank 48 through the check valve 61, respectively; the second cylinder 59 coupled with the first cylinder 58; and the compressor 63 coupled with the second cylinder 59 through the electromagnetic valve 62. The exhaust pipe 47 is provided to drain any overflow or excess electrolyte 43.

The electrolyte supplying apparatus 15 comprises: an electromagnetic pump 72 to pump the electrolyte 44 from the clean tank 53; and an electromagnetic valve 73 connected with the pump 72 and exhaust nozzle 74.

In response to the control signal from the working condition control unit 10, the electrolyte control unit 11 actuates the compressor 63 to make the first and second cylinders 58 and 59 operative. Thus, the electrolyte 43 containing electrolytic products in the gap 19 is drawn into the holes 46 and 75 and discharged into the dirty tank 48. The collected electrolyte 45 is pumped by the pump 49 and filtered by the filter 50. Electrolytic products are separated from the electrolyte 45 by the centrifugal separator 52. The resulting clean electrolyte 44 is pumped by the electromagnetic pump 72 and emitted into the gap 19 from the exhaust nozzle 74.

The operation of the electro-chemical machine in the second embodiment will now be described in accordance with the finishing method.

During finishing, in a manner similar to the first embodiment, the workpiece 2 is fixed to the workpiece fixing apparatus 3 and the electrode 4 is fixed to the lower end of the rod 18 of the electrode fixing apparatus 5. The electrode 4 is moved down until the electrode surface 4a faces and comes into contact with the working surface 2a of the workpiece 2. The electrode 4 is dipped into the electrolyte 43 in the working tank 16 together with the workpiece 2. This position is set to be the origin Q and is input by the input apparatus 13. Next, the electrode 4 is elevated to the position corresponding to the predetermined gap 19 set in the CPU 41. The electrolyte 43 flows into the gap 19 between the working surface 2a and the electrode surface 4a. When the flow of electrolyte 43 stops, the finishing work is started.

At the initial stage for finishing, in response to the control signal from the working condition control unit 10, the power supply apparatus 8 supplies a pulse current to the workpiece 2 and electrode 4. In this case for example, the ON-period of time of the pulse current is set to be 5 msec or less so that the current density is low, and this pulse current is used to improve the surface roughness. Thus, the raw material of the working surface 2a is eluted. After a predetermined pulse current has been supplied one or more times, the electrolyte 45 in the gap 19 containing electrolytic products is drawn through the holes 46 and 75 by the cylinders 58 and 59 of the electrolyte filtering apparatus 14 in a state in which the predetermined gap 19 is maintained. In this manner, the electrolyte 45 is discharged into the dirty tank 48 and, at the same time, the electrolyte supplying apparatus 15 operates almost interlockingly with this operation to supply the electrolyte 44 to the gap 19 through the exhaust nozzle 74.

After the electrolyte 44 has been emitted, the electrode 4 descends until the electrode surface 4a comes into contact with the working surface 2a. The position of the origin Q and the present position are compared by the control apparatus 12. A working depth by the single working operation (working by one pulse or by a few pulses) is measured. Thereafter, the electrode 4 is again lifted up so as to create the predetermined gap 19 between the working surface 2a and the electrode surface 4a. The electrolyte 43 flows into the gap 19 between the working surface 2a and the electrode 4a. When the flow of electrolyte 43 stops, pulses are supplied to start the next working.

The operations of the electrolyte filtering apparatus 14 and electrolyte supplying apparatus 15 will now be described.

After completion of a predetermined number of working operations, the electrolyte control unit 11 outputs a signal to the compressor 63. Air is supplied to the cylinder 57 to move the piston 59a in the direction of the arrow R (to the right in FIG. 7). Thus, the piston 58a of the cylinder 58 coupled with the piston 59a is also moved in the direction of the arrow R. Therefore, the electrolyte 45 in the gap 19 is pumped through the holes 46 and 75 and into the chamber A in the cylinder 58 in a predetermined amount. After a predetermined quantity of electrolyte 45 is stored in the chamber A, the electrolyte control unit 11 outputs a signal to the compressor 63. The electromagnetic valve 62 is made operative, thereby exhausting air from the cylinder 59 by reversing the connections thereto. Thus, the piston 59a is moved in the direction indicated by the arrow L (to the left in FIG. 7), and the piston 58a of the cylinder 58 is also moved in the direction of the arrow L. Thus, the electrolyte 45 in the chamber A is discharged to the dirty tank 48 through the check valve 61. The check valves 60 and 61 function to prevent the electrolyte 45 from flowing in directions other than predetermined directions.

When the electrolyte 45 containing the electrolytic products in the gap 19 is moved into the dirty tank 48 through the holes 46 and 75, check vaklve 60, chamber A of the cylinder 58, and check valve 61, the level of the surface of the electrolyte 45 is detected by the upper and lower limit float switches 56 and 57 and is input to the electrolyte control unit 11. When the level of the electrolyte in the dirty tank 48 has reaches a predetermined value, that is, when this level falls within a range of levels delimited by the switches 56 and 57, the electrolyte control unit 11 outputs a drive signal to the electromagnetic pump 49 to pump the electrolyte 45 from the dirty tank 48. The pumped electrolyte 45 is transferred through the filter 50 to the centrifugal separator 52.

The centrifugal separator 52 separates out the electrolyte 45 by centrifugal force. The separated clean electrolyte 44 containing no electrolytic products is stored in the clean tank 53. The electrolyte 44 stored in the clean tank 53 is then pumped by the electromagnetic pump 72 of the electrolyte supplying apparatus 15 and supplied to the gap 19 at a constant pressure through the exhaust nozzle 74 and electromagnetic valve 73.

As explained above, according to the second embodiment, the electrolyte 45 containing the electrolytic products in the gap 19 is drawn into the hole 46 which is formed in the electrode 4 and opens into the gap 19 at one end thereof, and is drained. Therefore, the electrolytic products produced by the working are only minimally diffused within the tank 16 out of the gap 19. The dirtiness of the electrolyte in the working tank 16 can be reduced. The clean electrolyte 44 is supplied through nozzle 74 almost simultaneously with the removal of the dirty electrolyte 45. Thus, electrolytic products and the like deposited on the working surface 2a and electrode surface 4a can be removed, and electrolytic products in the gap 19 can be reliably eliminated.

The foregoing finishing work is repeated a predetermined number of times in response to a command from the control apparatus 12. The accumulated value of the working depths is compared with the set value calculated by the working condition control unit 10. When the difference between the accumulated value and the set value is less than or equal to a predetermined value (for example 1 $\mu$m), the CPU 41 outputs a control signal to the current waveform setting unit 39, thereby changing the pulses produced by the power supply apparatus 8 to pulses adapted to form the glossy mirror surface, which in particular have a current density exceeding 3/2 of the current density during the initial stage of finishing. The working operation is executed a predetermined number of times by these pulses in a manner similar to that described above, thereby completing the finishing work.

Figure 8:
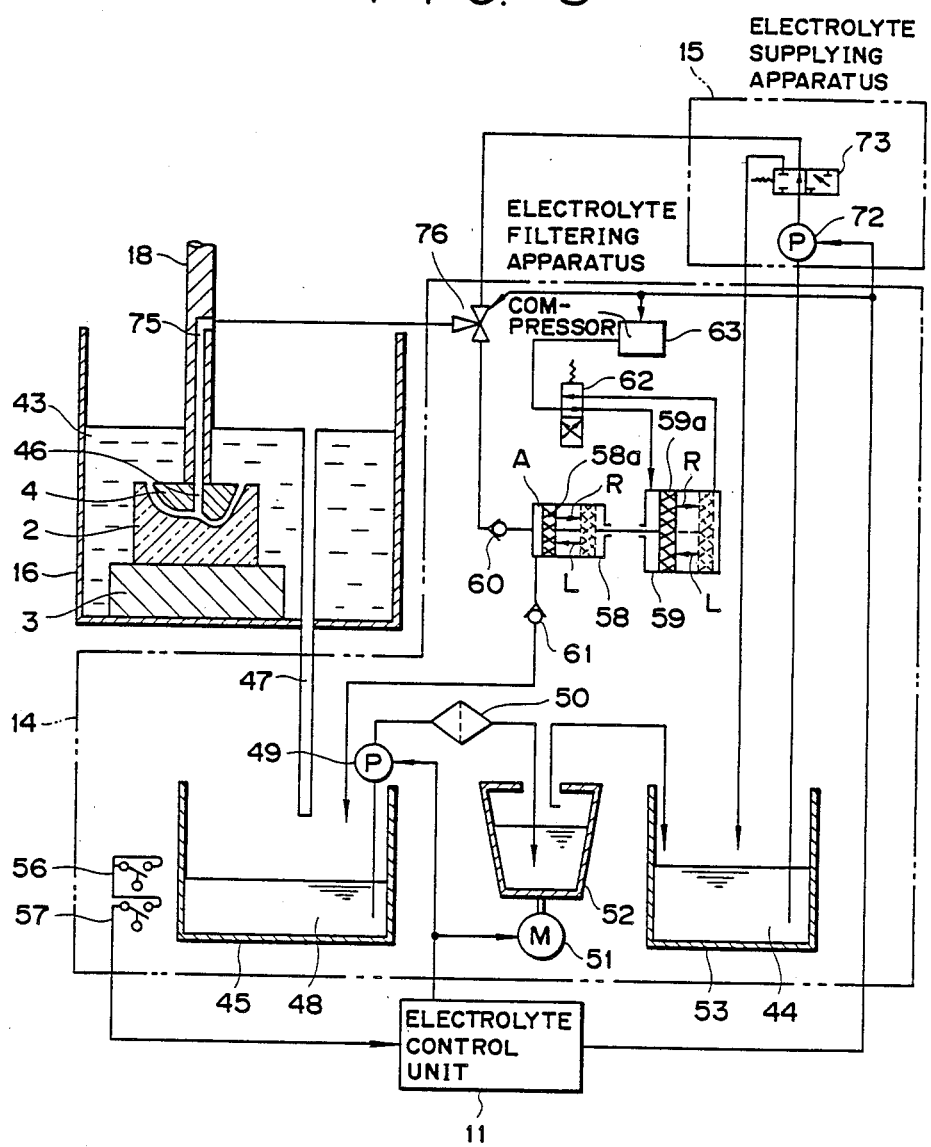
FIG. 8 is a diagrammatic view similar to FIG. 5 showing a third embodiment of the invention.
Figure 11:
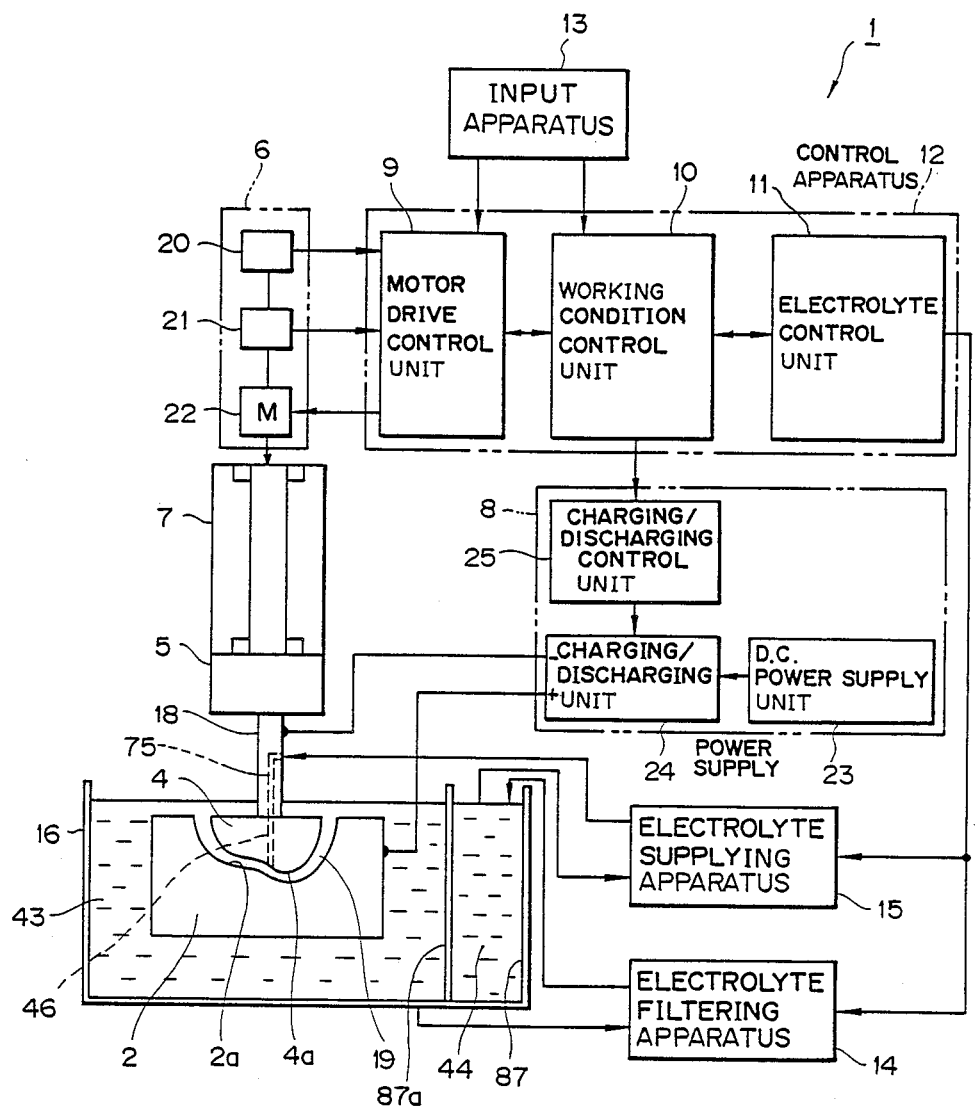
FIG. 11 is a diagrammatic view similar to FIG. 3 of the machine of FIG. 9.

FIG. 8 shows a third embodiment of the invention, in which the same parts and components as those in the first and second embodiments are designated by the same reference numerals and their detailed descriptions are omitted. A feature of the third embodiment is that the removal of the electrolyte 45 from the gap 19 and the supply of clean electrolyte 44 to the gap 19 are alternately performed through the hole 46 formed in the electrode 4 and hole 75 formed in the rod 18.

For this purpose, a change-over valve 76 is arranged between the hole 46, the first cylinder 58, and the electromagnetic valve 73. The valve 76 is switched by a control signal from the electrolyte control unit 11. When electrolyte in the gap 19 is to be withdrawn, the valve 76 is switched to the side of the first cylinder 58. The electrolyte in the gap 19 is transferred to the dirty tank 48 along the following path: hole 46 to hole 75 to changeover valve 76 to check valve 60 to chamber A of the first cylinder 58 to check valve 61. When the clean electrolyte 44 is supplied to the gap 19, the valve 76 is switched to the side of the electrolyte supplying apparatus 15. The electrolyte 44 is emitted to the gap 19 along the following path: electromagnetic pump 72 to electromagnetic valve 73 to change-over valve 76 to hole 75 to hole 46.

In the third embodiment, the case where one hole is formed in the electrode has been described. However, a plurality of holes can be also formed in the electrode. On the other hand, the case where a pair of cylinders are provided as the electrolyte supplying apparatus has been described. However, for example, the electrolyte supplying apparatus can also be cionstituted by combining a pump and an electromagnetic switch having a timer ready function.

As described in detail above for the third embodiment, the electro-chemical machine supplies pulse current through an electrolyte in a working tank to a workpiece and electrode arranged so as to face each other so that the workpiece is finished while electrolytic products produced in the gap between the workpiece and electrode are eliminated, and this machine comprises: an electrolyte filtering apparatus for removing electrolyte containing electrolytic products through a hole formed in the electrode and communicating with the gap at one end and for filtering the electrolyte; an electrolyte supplying apparatus for intermittently supplying the electrolyte filtered by the electrolyte filtering apparatus to the gap; and a power supply apparatus for supplying a pulse current to the workpiece and electrode when the flow of electrolyte to the gap from the electrolyte supplying apparatus stops. Therefore, electrolytic products produced in the gap between the workpiece and electrode can be reliably eliminated. The dirtiness of the electrolyte in the working tank can be reduced. The working conditions for the whole working surface are uniform. A three-dimensional metal surface having a glossy mirror surface can be obtained in a short period of time and is highly accurate with little surface roughness.

A fourth embodiment of the invention will now be described hereinbelow with reference to FIGS. 1, 2, 4, and 9 to 12. In FIGS. 9 to 12, the same parts and components as those in the first embodiment are designated by the same reference numerals, and detailed descriptions thereof are omitted.

The fundamental feature of the fourth embodiment, namely the difference from the first embodiment, will be explained. The other portions thereof are substantially the same as those in the first embodiment.

In the diagrams, the electro-chemical machine 1 in the fourth embodiment further has an electrolyte storage tank 87 provided in the working tank 16. The tank 87 is formed by vertically attaching a partition plate 87a on the bottom plate of the working tank 16. The electromagnetic pump 55 pumps the electrolyte 44 from the clean tank 53 into the storage tank 87.

In response to a control signal from the working condition control unit 10, the power supply apparatus 8 generates a pulse current of a predetermined current density which is calculated in accordance with the surface area of the workpiece 2. The power supply apparatus 8 comprises: the DC power supply unit 23 to supply a DC voltage; the charging/discharging unit 24; and the charge/discharge control unit 25 to control the unit 24. The charging/discharging unit 24 uses the DC voltage from the DC power supply unit 23 to charge a plurality of condensers, and discharges the charges accumulated in the condensers to the workpiece 2 and electrode 4 by opening the discharging switches.

On the basis of a control signal from the electrolyte control unit 11, the electrolyte supplying apparatus 15 supplies the electrolyte 44 filtered by the electrolyte filtering apparatus 14 from the electrolyte storage tank 87 to the gap 19 through the supply hole 75 in the rod 18 and the supply hole 46 in the electrode 4 at a constant pressure. Due to this, electrolytic products and the like produced between the working surface 2a and electrode surface 4a during the working are eliminated. The electrolyte filtering apparatus 14 and electrolyte supplying apparatus 15 are constituted as shown for example in FIG. 12.

In response to a control signal from the working condition control unit 10, the electrolyte control unit 11 actuates the electromagnetic pumps 49 and 55 and the motor 51, thereby filtering the electrolyte 45 and supplying the filtered electrolyte to the storage tank 87. The control unit 11 also drives the compressor 63 to make the first and second cylinders 83 and 84 operative, which in turn supply electrolyte 44 from the storage tank 87 to the gap 19 between the working surface 2a and the electrode surface 4a through the supply holes 75 and 46 in the rod 18 and electrode 4.

Figure 12:
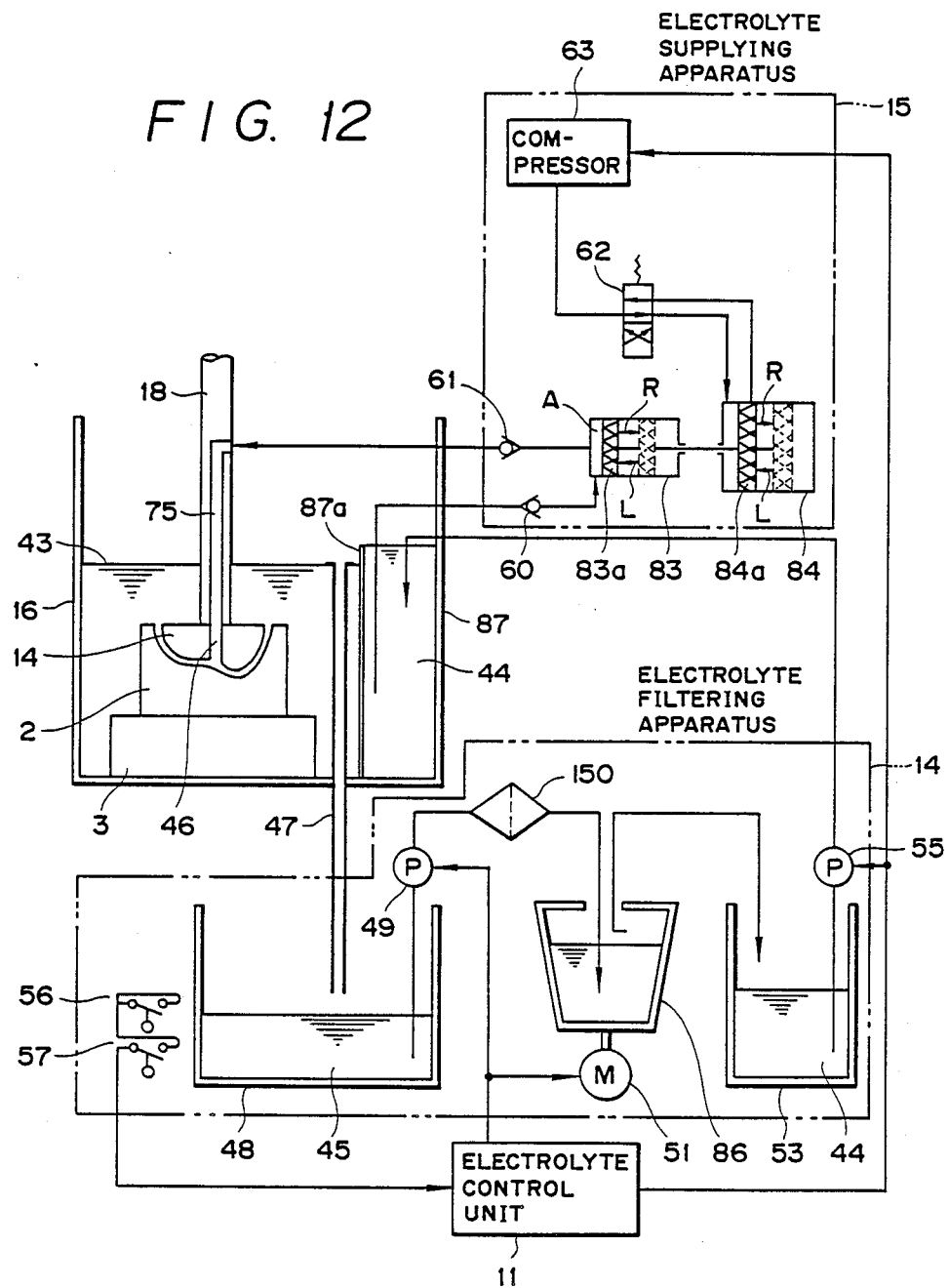
FIG. 12 is a diagrammatic view similar to FIG. 5 showing an electrolyte filtering apparatus and electrolyte supplying apparatus of the machine of FIG. 9.

The operation of the electro-chemical machine 1 of FIG. 12 will now be described in accordance with the finishing method.

Since the electro-chemical machine 1 in the fourth embodiment operates substantially in the same manner as the first embodiment, only the characteristics of operation different from the first embodiment will be described hereinbelow.

For finishing, the working 2 is fixed to the workpiece fixing apparatus 3 and the electrode 4 is fixed to the lower end of the rod 18 of the electrode fixing apparatus 5. The electrode 4 is moved down until the electrode surface 4a faces and comes into contact with the working surface 2a of the workpiece 2. The electrode 4 is dipped into the electrolyte 43 in the working tank 16 together with the workpiece 2. The electrode 4 is then elevated so as to produce the initial gap 19 between the working surface 2a and the electrode surface 4a. Electrolyte 43 flows into the gap 19 between the working surface 2a and the electrode surface 4a, and this position is set to be the working origin Q. The finishing work is started from this position.

During the initial stage of finishing to improve surface roughness, a pulse signal of a predetermined current density is supplied from the power supply apparatus 8 to the workpiece 2 and electrode 4 in response to a control signal from the working condition control unit 10. Thus, the raw material of the working surface 2a is eluted. After the predetermined pulse signal has been supplied one or more times, the electrolyte 45 containing electrolytic products in the gap 19 is eliminated by the electrolyte 44 supplied from the supply holes 75 and 46 by the operation of the cylinders 83 and 84 of the electrolyte supplying apparatus 15.

The electrolyte 45 containing electrolytic products is drained from the working tank 16 through the exhaust pipe 47 into the dirty tank 48. The level of the surface of the electrolyte 45 is detected by the upper and lower limit float switches 56 and 57. The detection signal is input to the electrolyte control unit 11. When the electrolyte level in the dirty tank 48 has reached a predetermined value, namely, when this level falls within a range delimited by the upper and lower limit float switches 56 and 57, the control unit 11 outputs a drive signal to the electromagnetic pump 49 to pump the electrolyte 45 from the dirty tank 48. The electrolyte 45 is then sent to a centrifugal separator 86 through the filter 50.

The electrolyte 44 stored in the storage tank 87 is held under the same conditions as the electrolyte 43 in the working tank 16. In particular, conditions such as temperature and the like are substantially equalized to those of the electrolyte 43. Under such conditions, the electrolyte 44 is supplied to the gap 19 in response to a control signal from the control unit 10.

After the predetermined pulse signal is produced a predetermined number of times, the control unit 11 outputs a signal to the compressor 63 to supply air to the cylinder 84. Thus, a piston 84a is moved in the direction indicated by the arrow R (to the right in FIG. 12). Thus, a piston 83a of the cylinder 83 coupled with the piston 84a is also similarly moved in the direction of the arrow R. Therefore, electrolyte 44 in the electrolyte storage tank 87 is drawn into the chamber A of the cylinder 83 by a predetermined amount. When a predetermined quantity of electrolyte 44 is in the chamber A, the control unit 11 outputs a signal to the compressor 63 to make the electromagnetic valve 62 operative in order to reverse control connections to the cylinder 84, thereby draining the air which was supplied to the cylinder 84. Thus, the piston 84a is moved in the direction of the arrow L (to the left in FIG. 12). The piston 83a of the cylinder 83 is also moved in the direction of the arrow L. Thus, the electrolyte 44 in the chamber A is supplied through the supply holes 75 and 46 to the gap 19. The check valves 60 and 61 function to prevent the electrolyte 44 from flowing in directions other than predetermined directions.

The foregoing finishing work is repeated a predetermined number of times pursuant to commands from the control apparatus 12. In a manner similar to the foregoing embodiments, when the difference between the accumulated value of the working depths and a set value becomes less than or equal to a predetermined value (for example 1 μm), the pulses supplied by the power supply apparatus 8 are changed to pulses to form a glossy mirror surface, which have a current density exceeding 3/2 of the current density used for the initial stage of finishing. The working is performed using these pulses a predetermined number of times by a method similar to the foregoing method. In this way, the finishing work is completed.

A pair of cylinders have been provided as the electrolyte supplying apparatus in the fourth embodiment. However, the invention is not limited to this construction. For example, the electrolyte supplying apparatus can be also constructed by combining a pump of a small capacity and an electromagnetic switch having a timer ready function. On the other hand, although the electrolyte storage tank has been constructed by vertically attaching the partition plate on the bottom plate of the working tank, the electrolyte storage tank can, for example, also be enclosed like a vessel at a proper position in the working tank. Further, the invention is not limited to the field of die finishing work, but can be also applied to finishing work after completion of a thermal process of a hypoid gear or the like by combining the electrolyte supplying apparatus with an automatic conveying apparatus.

As described in detail above, according to the fourth embodiment there is a working tank for an electrochemical machine in which an electrolyte is stored, a workpiece and an electrode are arranged so as to face each other across a predetermined gap containing the electrolyte, a pulse signal is supplied to the workpiece and electrode, and the workpiece is worked and finished while eliminating electrolytic products produced in this gap. An electrolyte storage tank is provided in the working tank in order to temporarily store the electrolyte which is intermittently supplied to the gap in order to eliminate the electrolytic products. Therefore, conditions such as temperature and the like can be substantially equalized between the electrolyte which is supplied to the gap in order to eliminate electrolytic products produced in the gap and the electrolyte stored in the working tank. The electrolyte storage tank is disposed at almost the same height position as the working gap. Consequently, there is no need to use a pump of large capacity or the like to pump the electrolyte to the electrolyte supplying apparatus. The supply of the electrolyte can be accurately controlled, and such control is needed, in particular in the case where a working surface having a three-dimensional shape is finished. The working conditions for the whole working surface can thus be kept uniform and a three-dimensional metal surface having a glossy mirror surface can be obtained in a short period of time in a highly accurate manner with little surface roughness. On the other hand, since there is no need to use a pump of large capacity or the like, the cost can be reduced. The foregoing and many other advantages are thus obtained.

Although the present invention has been shown and described with respect to preferred embodiments, it will be recognized that various changes and modifications, including the rearrangement of parts, lie within the spirit and scope of the invention.

The embodiments of the invention in which an exclusive property or privilege is claimed are defined as follows:

1. An electro-chemical apparatus, comprising pulse supply means for supplying pulses to a spaced workpiece and electrode arranged in an electrolyte in a working tank so that respective surfaces thereon which conform to each other in shape are facing each other, said pulses effecting finishing of said surface on said workpiece, and eliminating means for eliminating electrolytic products produced in a gap between said workpiece and said electrode, wherein said eliminating means includes electrolyte filtering means for withdrawing from said working tank and for filtering electrolyte containing electrolytic products;

wherein said eliminating means includes electrolyte supplying means for selectively supplying electrolyte filtered by said electrolyte filtering means to said gap; and wherein said pulse supply means includes power supply means for supplying at least one pulse to said workpiece and electrode during a first period of time when the flow of electrolyte from said electrolyte supplying means into said gap is stopped, said electrolyte supplying means thereafter supplying filtered electrolyte to said gap during a second period of time when said pulse supply means has halted pulse generation.

2. An apparatus according to claim 1, wherein said electrolyte supplying means includes a supply hole which is formed in said electrode and which opens at one end into said gap, and wherein said electrolyte filtering means withdraws electrolyte containing electrolytic products through said supply hole and then filters it.

3. An apparatus according to claim 2, wherein clean electrolyte is supplied to said gap by said electrolyte a supplying means substantially simultaneously with dirty electrolyte containing electrolytic products produced in said gap being withdrawn from said gap by said electrolyte filtering means.

4. An apparatus according to claim 2, wherein said electrolyte supplying means supplies the electrolyte to said gap through an exhaust nozzle which is arranged so as to be directed toward said gap.

5. An apparatus according to claim 1, wherein said electrolyte supplying means supplies electrolyte to said gap through a supply hole provided in said electrode.

6. An apparatus according to claim 1, including means for supporting said workpiece and electrode for relative movement, and for preventing relative movement thereof when said pulse supplying means is supplying a pulse thereto.

7. An electro-chemical apparatus, comprising pulse supply means for supplying pulses to a spaced workpiece and electrode arranged so as to face each other and disposed in an electrolyte in a working tank, said pulses effecting finishing of said workpiece, and eliminating means for eliminating electrolytic products produced in a gap between said workpiece and said electrode, wherein said eliminating means includes electrolyte filtering means for withdrawing from said working tank and for filtering electrolyte containing electrolytic products;

wherein said eliminating means includes electrolyte supplying means for intermittently supplying the electrolyte filtered by said electrolyte filtering means to said gap;

wherein said pulse supply means includes power supply means for supplying said pulses to said workpiece and electrode when the flow of electrolyte from said electrolyte supplying means into said gap has stopped; and wherein said electrolyte supplying means supplies the filtered electrolyte to a sub-tank provided in said working tank, and includes:

first and second cylinders which are operatively coupled so that said second cylinder drives said first cylinder, and means providing fluid communication between said first cylinder and said gap and between said first cylinder and said sub-tank;

a pair of check valves for respectively blocking flow of the electrolyte from said first cylinder to said sub-tank which is provided in said working tank and from said gap to said first cylinder; and means including a compressor coupled with said second cylinder for selectively operating said second cylinder which in turn actuates said first cylinder, thereby intermittently supplying electrolyte to said gap.

8. An electro-chemical apparatus, comprising pulse supply means for supplying pulses to a spaced workpiece and electrode arranged so as to face each other and disposed in an electrolyte in a working tank, said pulses effecting finishing of said workpiece, and eliminating means for eliminating electrolytic products produced in a gap between said workpiece and said electrode, wherein said eliminating means includes electrolyte filtering means for withdrawing from said working tank and for filtering electrolyte containing electrolytic products;

wherein said eliminating means includes electrolyte supplying means for intermittently supplying the electrolyte filtered by said electrolyte filtering means to said gap;

wherein said pulse supply means includes power supply means for supplying said pulses to said workpiece and electrode when the flow of electrolyte from said electrolyte supplying means into said gap has stopped;

wherein said electrolyte supplying means includes a supply hole which is formed in said electrode and which opens at one end into said gap;

wherein said electrolyte filtering means withdraws electrolyte containing electrolytic products through said supply hole and then filters it; and wherein said electrolyte filtering means supplies the electrolyte withdrawn from said working tank to a dirty tank, and includes:

an electromagnetic pump which pumps electrolyte containing electrolytic products from said dirty tank;

a filter which filters the electrolyte pumped by said electromagnetic pump; and a centrifugal separator which separates electrolytic products from the electrolyte from said filter using centrifugal force.

9. An electro-chemical apparatus, comprising pulse supply means for supplying pulses to a spaced workpiece and electrode arranged so as to face each other and disposed in an electrolyte in a working tank, said pulses effecting finishing of said workpiece, and eliminating means for eliminating electrolytic products produced in a gap between said workpiece and said electrode, wherein said eliminating means includes electrolyte filtering means for withdrawing from said working tank and for filtering electrolyte containing electrolytic products;

wherein said eliminating means includes electrolyte supplying means for intermittently supplying the electrolyte filtered by said electrolyte filtering means to said gap;

wherein said pulse supply means includes power supply means for supplying said pulses to said workpiece and electrode when the flow of electrolyte from said electrolyte supplying means into said gap has stopped; and wherein said working tank has therein an electrolyte storage tank which temporarily stores electrolyte, said electrolyte supplying means intermittently eliminating electrolytic products from said gap by supplying electrolyte from said storage tank to said gap.

* * * * *

UNITED STATES PATENT AND TRADEMARK OFFICE
CERTIFICATE OF CORRECTION

PATENT NO. : 4,880,516

DATED : November 14, 1989

INVENTOR(S) : Youhei KUWABARA et al

It is certified that error appears in the above-identified patent and that said Letters Patent is hereby corrected as shown below:

Column 17, line 28; delete "a".

Signed and Sealed this

Twenty-fourth Day of September, 1991

*Attest:*

HARRY F. MANBECK, JR.

*Attesting Officer*  *Commissioner of Patents and Trademarks*